(12) United States Patent
Leinung

(10) Patent No.: US 11,788,623 B2
(45) Date of Patent: Oct. 17, 2023

(54) SEALING INTERFACE FOR AN AIR DRYER CARTRIDGE AND A BASE FOR AN AIR DRYER CARTRIDGE

(71) Applicant: KNORR-BREMSE Systeme fuer Nutzfahrzeuge GmbH, Munich (DE)

(72) Inventor: Andreas Leinung, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 381 days.

(21) Appl. No.: 17/251,632

(22) PCT Filed: Jun. 4, 2019

(86) PCT No.: PCT/EP2019/064423
§ 371 (c)(1),
(2) Date: Dec. 11, 2020

(87) PCT Pub. No.: WO2019/238464
PCT Pub. Date: Dec. 19, 2019

(65) Prior Publication Data
US 2021/0270371 A1 Sep. 2, 2021

(30) Foreign Application Priority Data
Jun. 12, 2018 (DE) ...................... 10 2018 113 967.5

(51) Int. Cl.
*F16J 15/08* (2006.01)
(52) U.S. Cl.
CPC ................. *F16J 15/0818* (2013.01)
(58) Field of Classification Search
CPC ... F16J 15/0818; F16J 15/061; B01D 53/0415
See application file for complete search history.

(56) References Cited

U.S. PATENT DOCUMENTS

| 6,076,272 A * | 6/2000 | Conklin, III ......... B01D 53/261 96/138 |
| 2015/0008648 A1 | 1/2015 | Matsumoto et al. |

(Continued)

FOREIGN PATENT DOCUMENTS

| CN | 103998834 A | 8/2014 |
| CN | 104685270 A | 6/2015 |

(Continued)

OTHER PUBLICATIONS

Chinese-language Office Action issued in Chinese Application No. 201980039960.X dated Oct. 28, 2021 with English translation (20 pages).

(Continued)

*Primary Examiner* — Eugene G Byrd
*Assistant Examiner* — L. Susmitha Koneru
(74) *Attorney, Agent, or Firm* — Crowell & Moring LLP

(57) ABSTRACT

A sealing interface seals between an air dryer cartridge and a base for an air dryer cartridge. The sealing interface has at least one sealing element, at least one sheet metal element on the air-dryer-cartridge side, and at least one base-side extension, wherein the base-side extension has a bearing surface for the sealing element, which bearing surface is directed radially inward relative to the longitudinal axis of the base and of the air dryer cartridge. The sheet metal element is fastened on the air-dryer-cartridge side, and, in the assembled state, the sealing element presses against the bearing surface. A holding element is provided which, in the assembled state, is arranged such that the sealing element is held between the sheet metal element and the bearing surface at least partially in the axial and/or radial direction relative to the longitudinal axis by the sheet metal element and/or the holding element.

30 Claims, 3 Drawing Sheets

(56) References Cited

U.S. PATENT DOCUMENTS

2017/0106325 A1    4/2017  Kaupert et al.
2017/0106335 A1*   4/2017  Kaupert ............... B01D 53/261

FOREIGN PATENT DOCUMENTS

| DE | 10 2016 208 355 A1 | 11/2017 |
| EP | 2 229 994 A2 | 9/2010 |
| EP | 3 156 296 A2 | 4/2017 |
| EP | 3 159 231 A1 | 4/2017 |
| JP | 2004-538123 A | 12/2004 |
| WO | WO 2017/102755 A1 | 6/2017 |
| WO | WO 2017/194671 A1 | 11/2017 |

OTHER PUBLICATIONS

International Preliminary Report on Patentability (PCT/IB/326 & PCT/IB/373) issued in PCT Application No. EP2019/064423 dated Dec. 24, 2020, including English translation of document C2 (German-language Written Opinion (PCT/ISA/237) previously filed on Dec. 11, 2020) (eight (8) pages).
International Search Report (PCT/ISA/210) issued in PCT Application No. PCT/EP2019/064423 dated Dec. 19, 2019 with English translation (five (5) pages).
German-language Written Opinion (PCT/ISA/237) issued in PCT Application No. PCT/EP2019/064423 dated Dec. 19, 2019 (six (6) pages).
German-language Office Action issued in German Application No. 10 2018 113 967.5 dated Feb. 22, 2019 (six (6) pages).

* cited by examiner

SEALING INTERFACE FOR AN AIR DRYER CARTRIDGE AND A BASE FOR AN AIR DRYER CARTRIDGE

BACKGROUND AND SUMMARY OF THE INVENTION

The present invention relates to a sealing interface between an air dryer cartridge and a base for an air dryer cartridge, wherein the sealing interface has at least one sealing element, one sheet metal element on the air-dryer-cartridge side, and one base-side extension.

Sealing between air dryer cartridges and a corresponding fastening device on the corresponding air treatment unit of commercial vehicles is already known from the prior art.

Thus, DE 10 2016 208 355 A1 discloses a compressed air treatment system for a compressed air treatment unit of a commercial vehicle, which has a compressed air treatment apparatus, an air dryer cartridge and a sealing ring for sealing between the air dryer cartridge and the compressed air treatment apparatus. The air dryer cartridge has a cartridge housing with a closed housing cover, a desiccant held in the cartridge housing, a fastening flange for closing an open end of the cartridge housing remote from the housing cover and for fastening the air dryer cartridge on the compressed air treatment apparatus, and a bottom plate.

Moreover, EP 2 229 994 A2 relates to a seal component comprising a seal body that has a first seal surface for sealing a volume to be sealed. The seal body at least partially surrounds an electronic component. An operating method for a seal component comprises the following steps: supplying a seal component according to the invention, changing information in an electronic memory of the seal component, interrogating the information from the electronic memory of the seal component, evaluating the interrogated information and performing an action in accordance with and/or taking into account a result of the evaluation from the evaluation of the interrogated information.

The seal concepts indicated in the prior art between an air dryer cartridge and the air treatment unit associated therewith must still be assembled with a high expenditure of force or torque and by using special tools.

It is the object of the present invention to develop a sealing interface between an air dryer cartridge and a base for an air dryer cartridge of the type stated at the outset in an advantageous manner, in particular in such a way that the ease of assembly and the sealing of an air dryer cartridge is improved by means of the sealing interface.

According to the invention, this object is achieved by means of a sealing interface between an air dryer cartridge and a base for an air dryer cartridge. The sealing interface has at least one sealing element, at least one sheet metal element on the air-dryer-cartridge side, and at least one base-side extension, wherein the base-side extension has a bearing surface for the sealing element, which bearing surface is directed radially inward relative to the longitudinal axis of the base and of the air dryer cartridge, wherein the sheet metal element is fastened on the air-dryer-cartridge side, and, in the assembled state, the sealing element presses against the bearing surface, wherein furthermore, at least in some section or sections, a holding element is provided between the sheet metal element and the base-side extension, which holding element, in the assembled state, is arranged in such a way that the sealing element is held between the sheet metal element and the bearing surface at least partially in the axial and/or radial direction relative to the longitudinal axis by means of the sheet metal element and/or the holding element.

The invention is based on the basic idea that—in contrast to a square-section sealing ring often used in this context, which is supported axially by a base-side extension for the air dryer cartridge—use is made of a sealing element which is held radially against the bearing surface by means of the sheet metal element and thereby additionally at least partially axially and/or radially by means of a further holding element. In this context, it is contemplated, in particular, that the sealing element is held at least partially in the axial and/or radial direction in relation to the longitudinal axis between the sheet metal element and the bearing surface by means of the sheet metal element and the holding element. Owing to this pressure or this pressure contact, the sealing element can seal the air dryer cartridge at least partially radially on the inside relative to the base-side extension, thereby enabling the friction that has to be overcome (as is the case with axial sealing) to be significantly minimized during the assembly of the air dryer cartridge. Consequently, significantly simpler and quicker assembly of the air dryer cartridge can be achieved since the sealing element no longer has to be pressed axially against the base-side extension during assembly itself and in the assembled state. It is furthermore also possible in this context to dispense with corresponding guiding components or to significantly reduce the use thereof. Such guiding components are, for example, extension surfaces, guide surfaces, pressure surfaces etc. It is accordingly also additionally possible to dispense with corresponding guiding components, such as centering pins, centering shoulders or the centering surfaces thereof or to reduce the use thereof. As a consequence, it is furthermore also possible to dispense at least partially with the special tools that would otherwise be usual in this case for the assembly of the air dryer cartridge. The required assembly forces and torques can be reduced through such a design of the sealing interface, thus also enabling the process of assembling the air dryer cartridge to be carried out more quickly and, as a result, more efficiently overall. Furthermore, provision can also be made for the sheet metal element to have an elastic hook-shaped section designed as a radial compression spring. The sheet metal element is designed as a bottom cover for the end of the air dryer cartridge which faces the base-side extension in the assembled state. This sheet metal element has a shape which is substantially like that which is already known in the prior art, at least in some section or sections. The above-described configuration or design of the sealing interface also allows, in particular, easier positioning of the components of the sealing interface relative to one another.

Furthermore, provision can be made for the holding element to be arranged between the sheet metal element and the base-side extension, at least in some section or sections. By means of such a configuration, it is possible to ensure that the sealing element can be held more effectively and held in the desired position in the assembled state.

Moreover, it is contemplated for the holding element to be designed as a separate component from the sheet metal element. It is also contemplated then to manufacture the holding element from some other material, for example. Assembly may be made easier by different pairing of materials. However, leak-tightness, corrosion and wear can also be influenced and also set by means of the choice of material and pairing of different materials.

In principle, therefore, an alternative such that the holding element is formed by a holding section of the sheet metal element is contemplated. The holding element can thereby be formed by appropriate shaping of the sheet metal element. The holding element is then formed from the sheet metal element by forming, for example, and is formed integrally with the sheet metal element.

In particular, provision can be made for the holding element to be formed by a step and/or an offset of the sheet metal element.

The sealing interface can furthermore have at least one first stabilizing surface, which is characterized and arranged in such a way in the assembled state that it serves to stabilize the air dryer cartridge in the axial direction.

The first stabilizing surface can be formed by a first stabilizing surface section of the sheet metal element.

Provision can furthermore be made for the sealing interface to have at least one second radial holding and/or pressure surface, which is characterized and arranged in such a way in the assembled state that it holds and/or presses the sealing element in the radial direction against the radially inward-directed bearing surface of the base-side extension.

Provision can furthermore be made for the sealing interface to have at least one third stabilizing surface, which is characterized and arranged in such a way in the assembled state that it serves to stabilize the sealing element and/or that it holds the sealing element in the axial direction and/or stabilizes it against further pressure influences.

Moreover, provision can be made for the holding element to be designed as a holding element separate from the sheet metal element.

It is furthermore contemplated for the holding element to be part of the air dryer cartridge.

It is also possible, in particular, for the holding element to be connected integrally to the air dryer cartridge.

If the holding element and the air dryer cartridge are composed of different materials, they can be connected to one another by material bonding. Examples of such material bonding can be, for example, vulcanizing, adhesive bonding, brazing, welding etc.

The holding element and/or an end region of the base-side extension can have an outer contour which interacts in the assembled state with a mating contour, e.g. a mating contour in the holding element, in the sheet metal element and/or in some other abutment, such as a housing wall of the air dryer cartridge or the base-side extension, and is arranged so that they engage at least partially one inside the other.

The contour can be characterized by sunk areas, notches, recesses and corresponding counterparts such as raised portions. These contours and profile elements make it possible to variably set the pressure surface of the holding element and, in particular, of the base-side extension and also the load which occurs there in this region. It is thereby possible to configure the design in a more variable way overall. It is also possible that further design parameters in respect of the fastening of the air dryer cartridge will be available by virtue of the variable setting of the pressure surface. The contour makes it possible, by means of the adjustable area, to obtain a further design parameter which influences the tightening of the air dryer cartridge. Thus, the tightening of the air dryer cartridge no longer depends only on the material properties of the holding ring. It is thereby also possible to shorten the required rotation path when screwing in the air dryer cartridge at the interface with the base.

It is furthermore contemplated that at least one supporting element, which is arranged in such a way in the assembled state that the sealing element is supported at least partially in the axial direction in relation to the longitudinal axis by means of the supporting element, can be provided between the sheet metal element and the bearing surface.

By virtue of this type of support, the sealing element can additionally seal the air dryer cartridge at least partially radially on the inside and/or axially relative to the base-side extension. Consequently, the sealing effect of the sealing interface can be improved overall. Moreover, vibrations and shocks emanating from the operation of the vehicle, in particular a commercial vehicle, can be damped more effectively by means of such support of the sealing element by the supporting element and by means of the interaction of the sealing element with the holding element. Provision can furthermore be made for the sealing effect of the sealing element to be further improved by the above-described configuration of the sheet metal element in interaction with the supporting element.

Moreover, provision can be made for the supporting element to have a substantially wedge-shaped cross section. The longitudinal axis or longitudinal axes of the air dryer cartridge and of the base or base-side extension are furthermore aligned substantially coaxially with one another. The wedge shape of the supporting element makes possible an improvement in the sealing effect, in particular through the interaction with the sealing element. This interaction with the sealing element is comparable with an inclined plane, with the result that, on the one hand, the supporting element presses the sealing element into contact on the air-dryer-cartridge side and, on the other hand, supports it at least partially axially.

In this context, provision can be made, in particular, for the cross section to taper radially inward in relation to the longitudinal axis of the base and of the air dryer cartridge. Particularly the combination of axial pressure and support of the sealing element is made possible by the inward-tapering cross section of the supporting element. Since the sheet metal element at least partially produces the required axial and radial supporting and pressing force for the sealing element, such shaping of the supporting element through interaction with the sheet metal element can increase the sealing effect of the sealing element, especially in the axial and radial directions.

It is furthermore contemplated that the supporting element is designed as a supporting ring. Since air dryer cartridges generally have round or circular cross sections, the supporting element has, in particular, advantageous support properties for the sealing element if, in the form of a supporting ring, it likewise has a round or circular basic shape. The supporting ring is designed as a radially continuous or radially closed supporting ring. Such a configuration improves more constant or more uniform force distribution to the sealing element and thus ensures more stable and more accurately positioned mounting of the sealing element. The sealing effect of the sealing interface can thereby be further improved.

Moreover, it is contemplated in this context, in particular, that the supporting ring has at least one supporting surface for the sealing element, which encloses an acute angle with the bearing surface in the assembled state. The sloping alignment of the supporting surface at an acute angle in relation to the radially inward-directed bearing surface allows more targeted elastic deformation of the sealing element in relation to the bearing surface of the base-side extension and to the sheet metal element. By means of such shaping or arrangement, it is thus likewise possible to increase the sealing effect.

It is furthermore contemplated that the sheet metal element has a round basic shape. Since, as already described above, air dryer cartridges generally have round cross sections, a round configuration of the sheet metal element, in particular in the form of an annular shape, is likewise particularly advantageous. The round or circular sheet metal element is designed as a radially continuous or radially closed sheet metal element. Such a configuration improves more stable and more uniform retention or mounting of the sealing element, which is likewise of closed annular design. The sheet metal element furthermore has a centrally arranged through hole for compressed air. It is thereby possible to enable a particularly simple and efficient flow path for the compressed air flowing in and out of the air dryer cartridge, both in normal operation and in the regeneration mode.

In particular, it is furthermore contemplated in this respect that the sheet metal element is of annular design. The sheet metal element is designed as a radially continuous or radially closed and annular sheet metal element. Such a configuration improves more constant or more uniform imposition of the radial and axial sealing force on the sealing element and thus ensures more stable and more accurately positioned mounting of the sealing element. The sealing effect of the sealing interface can thereby be further improved.

It is furthermore possible that the sheet metal element has at least one end section situated radially on the inside in relation to the longitudinal axis of the base and of the air dryer cartridge, said end section at least partially surrounding the sealing element in the assembled state. By virtue of such an alignment, this end section, which is designed as a free, radially inner end section, can act with a particularly high supporting force and pressure force on the sealing element while being of great structural simplicity. The higher this supporting force (at least within appropriately chosen limits), the better the sealing effect of the sealing element can be influenced. Thus, this configuration of the hook-shaped end section also contributes to an improvement in the sealing effect. The engagement around the sealing element thus brings about radial and axial contact pressure or pressing of the sealing element against the supporting element and against the bearing surface of the base-side extension. By using an end section of this kind, it is possible with just one component, namely the end section, to bring about radial and axial contact pressure, resulting in a very simple structural configuration of the sheet metal element and of the sealing interface.

Moreover, provision can be made for the sealing element to be pressed radially and/or axially against the holding element in relation to the longitudinal axis of the base and of the air dryer cartridge by means of the end section in the assembled state. By using an end section of this kind, it is possible with just one component, namely the end section, to bring about radial and/or axial contact pressure or pressing of the sealing surface or sealing surfaces of the sealing element, resulting in a very simple and compact structural configuration of the sealing interface. Consequently, the air dryer cartridge and the corresponding flange thereof or the base can also be made more compact, as a result of which less installation space within the commercial vehicle is required overall.

It is likewise contemplated that the base-side extension is of substantially annular, in particular fully annular design, and has at least one extension shoulder, wherein the supporting element is placed against the extension shoulder in such a way in the assembled state that the supporting element can be supported at least partially axially and/or at least partially radially in relation to the longitudinal axis of the base and of the air dryer cartridge by means of the extension shoulder. The annular configuration of the base-side extension offers many structural advantages in respect of the joint connection of these two components, especially with the coupling of likewise round, and in most cases even circular, air dryer cartridges. The radial and/or axial support of the supporting element by means of the extension shoulder offers very rigid and, as a result, reliable support of the supporting element. Finally, the extension shoulder is a structural part of the base-side extension which, as a structural component of a flange of an air treatment plant, for example, is in any case of very rigid and stable design.

It is furthermore possible that the holding element is designed as a holding ring, which, in some section or sections, is arranged between the base-side extension and at least one housing wall of the air dryer cartridge and/or the sheet metal element in the assembled state. By means of the holding ring, it is possible, in particular, to improve the axial sealing between the base-side extension and a housing wall on the air-dryer-cartridge side or the sheet metal element. Moreover, the sealing effect can be further improved, in particular, because the holding ring can be press-fitted statically, i.e. substantially immovably, between two components that are at rest relative to one another. By virtue of such an arrangement of the holding ring, oscillations, vibrations and shocks, especially in the axial direction, emanating particularly from the commercial vehicle can furthermore be damped in an effective manner.

In this context, it is, in particular, additionally contemplated that, at least in some section or sections, the holding element forms a press fit with the base-side extension and with the sheet metal element and/or the housing wall in the assembled state. Particularly the axial force exerted by the base-side extension on the holding element and the sheet metal element can be adjusted in a particularly simple and precise manner in the assembled state. This can be based on the fact that the housing wall on the air-dryer-cartridge side, with the sheet metal element fastened thereon, can generally be screwed onto the base. A screw fastening, in particular, allows very simple and precise adjustment of the sealing forces required for the press fit.

It is furthermore contemplated that the holding element partially surrounds at least one end of the base-side extension, the end facing the sheet metal element. The resulting smaller outside diameter of the holding element or holding ring, at least in some section or sections, in relation to an outside diameter of the base-side extension enables the base-side extension to be at least partially surrounded by the holding ring. Consequently, it is a very simple matter for the holding ring to be pressed axially against the sheet metal element or the housing wall on the air-dryer-cartridge side by one end of the base-side extension. By virtue of the fact that the base-side extension is surrounded, it is furthermore also possible for the holding ring to be stabilized in the radial direction. The contact pressure effect of the holding ring can thus be further improved by both above-described design and structural configurations.

In addition, provision can be made for the holding element to have at least one radial region, which extends radially between the end section of the sheet metal element and the bearing surface of the base-side extension in relation to the longitudinal axis of the base and of the air dryer cartridge, in particular wherein the radial region has a wedge-shaped cross section. In this case, the wedge shape of this radial region interacts, in particular, with the respective sheet metal element section that is in contact. By virtue of the corresponding shape of the end section of the sheet metal element, high radial and axial forces can be transmitted by the sheet metal element to the radial region. The radial region, in turn, transmits the forces acting on it to the sealing element, which is thereby deformed by virtue of its elastic properties. The radial region thus offers another very simple structural way of transmitting the radial and axial forces emanating from the end section to the sealing element. The production of the radial and axial forces emanating from the end section is accomplished, in particular, on the basis of the elastic bending and of its hook-type shape.

It is furthermore contemplated that the holding element has at least one contact pressure surface for the sealing element, wherein the contact pressure surface is aligned substantially perpendicularly to the bearing surface of the base-side extension in the assembled state.

In this context, it is furthermore possible, in particular, to make provision for the radial region of the holding element to have at least one contact pressure surface for the sealing element, wherein the contact pressure surface is aligned substantially perpendicularly to the bearing surface of the base-side extension in the assembled state. The perpendicular alignment of the contact pressure surface in relation to the radially inward-directed bearing surface allows, in particular, a high axial sealing force in relation to the sealing element. The axial sealing effect, in particular, of the sealing interface can thereby be improved or increased. The perpendicular alignment of the contact pressure surface in relation to the bearing surface furthermore allows a maximum elastic deformation of the sealing element in the axial and radial directions. Consequently, the sealing effect in the radial direction can simultaneously also be improved by such an alignment of the contact pressure surface and as a result of the elastic properties of the sealing element.

In this context, it is furthermore contemplated that the radial region of the holding ring has at least one contact surface, which is in contact with the sheet metal element in the assembled state, wherein the contact surface encloses an acute angle with the bearing surface of the base-side extension.

It is furthermore possible that the sealing element is pressed against the bearing surface of the base-side extension in such a way by means of the sheet metal element in the assembled state that the sealing element is additionally pressed against the holding element. By means of the sheet metal element, the end section of which surrounds or encloses the sealing element partially axially and radially, a constant sealing force can be transmitted to the sealing element in the radial and axial directions. This sealing force transmitted to the sealing element can be absorbed by virtue of the spatial arrangement of the bearing surface of the base-side extension in the radial direction and of the holding element in the radial and/or axial direction. Owing to the radial pressure of the sealing element against the bearing surface, the elastic sealing element is additionally deformed, and therefore the sealing element can also be deformed to a greater extent in the axial direction. This axial deformation likewise presses the sealing element to an increased extent against the contact pressure surface of the radial region of the holding element. These abovementioned effective surface pairs ensure an improved radial and axial sealing effect of the sealing interface, especially when combined with the sealing element.

Provision can furthermore be made for the base-side extension and the sheet metal element, in particular the end section of the sheet metal element, to form at least one connecting gap, by means of which the sealing element is subjected to pressure and/or connected to pressure by means of at least one fluid, in particular compressed air, from at least one pressure chamber on the air-dryer-cartridge side. The connecting gap is furthermore designed as an annular gap. This type of pressurization or pressure connection ensures additional pressure of the elastic sealing element against the respective effective, boundary and/or supporting surfaces of the supporting element thereof, of the sheet metal element, of the bearing surface of the base-side extension, and of the holding ring. By means of the pressure connection or pressurization, it is accordingly possible to increase the sealing force and the associated surface pressure between the sealing element and the above-described surfaces, thereby improving and reinforcing the sealing effect. In this context, the pressure connection or pressurization can be performed with a system pressure of up to about 17 bar. Thus, according to the invention, it is envisaged that the leaktightness of the sealing element is reinforced essentially by the system pressure (in contrast to the working conditions in the case of the conventional square-section ring). Consequently, the required pressure of the holding element on the base-side extension is determined especially by the requirement that the screwed connection of the air dryer cartridge to the base-side extension should be play-free and damped. A higher pressure of the holding element by screwing the air dryer cartridge on more tightly for the purpose of leaktightness is therefore not necessary, resulting in a simpler construction of the holding element and of the sealing interface as well as in simpler assembly.

It is furthermore contemplated that the sheet metal element and/or at least one securing element, which is fastened to the base-side extension, form/s at least one anti-rotation safeguard for the air dryer cartridge and for the base. An anti-rotation safeguard is especially important particularly for unintentional release of the sealing interface from the base-side extension and accordingly for increasing the functional reliability of the sealing interface. Since air dryer cartridges are generally screwed with a rotary action onto a corresponding flange or to the base of an air treatment unit, an anti-rotation safeguard is therefore a particularly effective device for keeping the sealing interface in a functional and reliably sealing state in the assembled state. Formation of the anti-rotation safeguard from the sheet metal element and the securing element offers a configuration of the anti-rotation safeguard which is particularly simple structurally and in terms of design. In this respect, the sheet metal element can be designed in some section or sections as a bayonet ring with at least one securing finger, which forms a corresponding bayonet recess. The counterpart corresponding to the bayonet recess is formed by the securing element in the form of a securing screw. Of course, it is also possible for the sheet metal element to have a plurality of such bayonet recesses, which can then interact or which interengage with a plurality of corresponding securing screws in the assembled state. The presence of an additional anti-rotation safeguard of this kind comprising at least one securing element and securing finger is thus another reason why it is possible to dispense with increased screwing torques and special tools for assembling the air dryer cartridge. The necessary pressure on the holding element and hence the screwing torque of the overall air dryer cartridge can thus be doubly reduced. On the one hand, the pressure can be reduced by the proportion required for the leaktightness of a conventional square-section ring. On the other hand, the pressure can furthermore be reduced by the proportion necessary to ensure that the air dryer cartridge is secured against accidental release simply on the basis of the non-positive engagement that arises inter alia from the pressure on the holding element. Thus, all that is necessary is a proportion of the pressure on the holding element which ensures adequate damping of the screwed-on air dryer cartridge so that the screwed joint and the securing device comprising a finger on the sheet metal element and the securing screw are not damaged or unintentionally released when subject to vibrations in the vehicle.

It is furthermore contemplated that the sealing element is designed as a sealing ring, in particular an O-ring of circular cross section. In sealing technology for pneumatic components, such as the sealing interface for the air dryer cartridge or an air treatment unit connected thereto, O-rings form inexpensive, reliable and widely tested seals.

In particular, it is furthermore possible in this context to envisage that the sealing element is formed at least partially from an elastomer. The sealing element or O-ring is formed at least partially from an elastomer because it can be compressed or pressed against those effective surfaces of the sealing interface which adjoin it in the assembled state by virtue of its elastic properties, and in this way the sealing effect can be additionally improved.

Moreover, it is possible that the holding element is formed at least partially from a thermoplastic and/or at least partially from a thermoset and/or at least partially from an elastomer. The axial and radial supporting force which acts between the holding element and the sealing element in the assembled state arises, in particular, from the interaction with the sheet metal element end section formed or aligned obliquely or in a hook shape. Consequently, the sealing force acting on the holding element from the end section of the sheet metal element should be as high as possible in the present case. The sealing force or the surface pressure associated therewith can be maximized, in particular, by reducing the frictional force. The reduction in the frictional force can be minimized not only by means of the angle of the contact pressure surface of the holding element but also by the friction pairing comprising the sealing element and the contact pressure surface. The contact pressure surface preferably forms a substantially right-angled alignment with respect to the bearing surface of the base-side extension. As an alternative, however, it is also possible to envisage that the contact pressure surface of the holding element or the radial section thereof forms an acute or obtuse angle with the bearing surface of the base-side extension. Through the use of a plastic with a low coefficient of friction, it is thus possible to further reinforce the contact pressure force on the sealing element and thus the sealing effect. Moreover, the selection of an elastically deformable material (e.g. a rubber material) enables the holding element to exert a vibration damping effect on the base-side extension and, in particular, on the air dryer cartridge. Moreover, the holding element acts as an additional anti-rotation safeguard between the sheet metal element and the base-side extension in the assembled and clamped or compressed state, thereby making it possible to provide a design of the sealing interface which is even less sensitive to vibration.

Provision can furthermore be made for the sealing element and the holding element to be connected integrally to one another. The integral connection ensures, in particular, a more efficient usage of the material of the sealing and holding element, resulting in a smaller overall volume and thus, overall, in an advantageously configured sealing interface. Moreover, it is possible to eliminate one sealing surface pair by means of the integral connection, resulting in an additionally improved sealing effect of the integral composite structure comprising the sealing element and the holding element. The integral connection between the sealing element and the holding element should be interpreted, in particular, to the effect that there is a connection between the two elements at the atomic level. In other words, the sealing element and the holding element form a common material bond without at least one respective distinct mutual boundary surface. However, the integral composition is consciously not intended to exclude the possibility that the sealing element and the holding element may also be formed from different materials. If the sealing element and the holding element are composed of different materials, they can be connected to one another by material bonding. Examples of such material bonding can be vulcanizing, adhesive bonding, brazing, welding etc.

It is likewise contemplated that the sheet metal element has at least one supporting projection, by means of which the holding element can be supported radially on the outside in relation to the longitudinal axis of the base and of the air dryer cartridge. By means of the supporting projection, it is possible, in particular, to improve the positioning accuracy of the holding element in the radial direction in relation to the longitudinal axis of the base and of the air dryer cartridge. Improved positioning accuracy has a positive effect, in turn, on the sealing surface pairing between the holding element and the sealing element and on the at least partially formed pressure connection between the sheet metal element, the holding element and the base-side extension. Moreover, the supporting projection can be used to provide an insertion surface or insertion geometry for a conventional square-section seal in the event that the sealing interface according to the invention is used in addition or as an alternative to a square-section sealing ring. Consequently, it is possible to implement "backwards compatibility" for the use of a conventional square-section sealing ring, thereby further increasing the versatility of use of the sealing interface.

According to the invention, the above-described air dryer cartridge can furthermore be used for the above-described air treatment unit.

Moreover, the air dryer cartridge according to the present invention is set up and designed in such a way that the air dryer cartridge has the sealing interface according to the invention at least in part.

Likewise conforming to the present invention is the base for the air treatment device having the features of the base, in particular wherein the base is set up and designed in such a way that the above-described air dryer cartridge can be fastened, in particular screwed, to the base.

In addition, provision can be made according to the invention for the above-described air treatment unit to have at least one above-described sealing interface, at least one above-described air dryer cartridge and at least one above-described base.

Furthermore, the present invention relates to a holding element having the features of a holding element for a sealing interface as described above.

Further details and advantages of the invention will now be explained in greater detail with reference to the illustrative embodiments illustrated in the drawings.

DETAILED DESCRIPTION OF THE DRAWINGS

Figure 1:
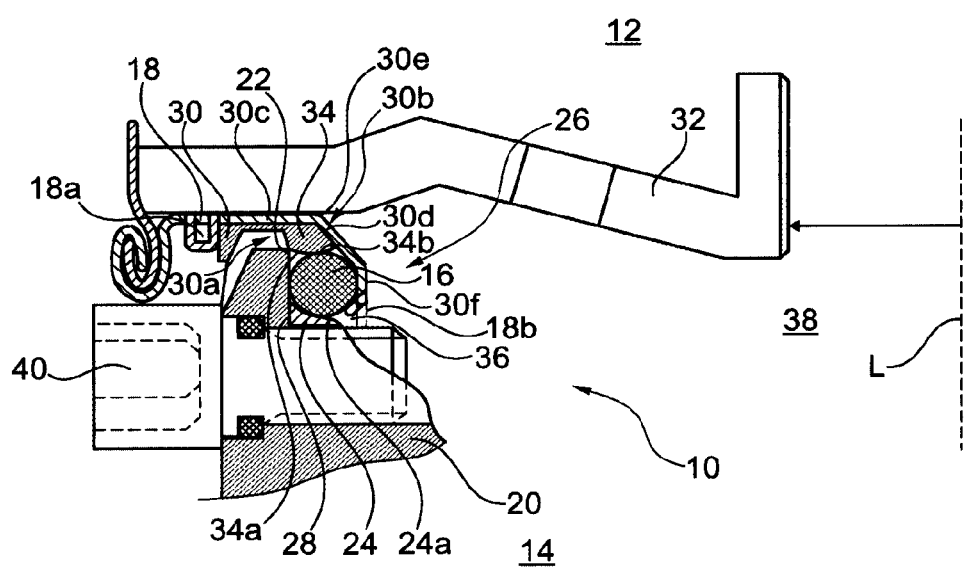
FIG. 1 shows a schematic sectional illustration of one illustrative embodiment of a sealing interface according to the invention.

FIG. 1 shows a schematic sectional illustration of one illustrative embodiment of a sealing interface 10 according to the invention.

The schematic sectional illustration shown in FIG. 1 is a schematic radial half section of the sealing interface 10, which is of rotationally symmetrical design.

The sealing interface 10 is arranged between an air dryer cartridge 12 and a base 14 for an air dryer cartridge 12.

The base 14 is designed as a flange-type component and, in some region or regions, forms a fastening interface between the air dryer cartridge 12 and an air treatment unit (not shown in FIG. 1).

The sealing interface 10 furthermore has a sealing element 16, a sheet metal element 18 on the air-dryer-cartridge side and a base-side extension 20.

The base-side extension 20 is of fully annular design.

Accordingly, the base-side extension 20 rises in a ring shape from the base 14 for the air dryer cartridge 12.

The base-side extension 20 thus forms a projection in the form of a ring or of a circular ring.

The base-side extension 20 furthermore has a bearing surface 22 for the sealing element 16, said surface being directed radially inward in relation to the longitudinal axis L (also referred to below as the longitudinal axis L) of the base 14 and of the air dryer cartridge 12.

The bearing surface 22 of the base-side extension 20 is designed as a circular-cylindrical lateral surface which extends in the axial direction in relation to the longitudinal axis L and the center line of which is aligned coaxially with the longitudinal axis L.

A supporting element 24 can furthermore be arranged between the sheet metal element 18 and the bearing surface 22.

The supporting element 24 has a wedge-shaped cross section.

This wedge-shaped cross section tapers radially inward in relation to the longitudinal axis L of the base 14 and of the air dryer cartridge 12.

In the context of this invention, the terms "axial" or "axial direction" should be interpreted to mean a direction or a direction vector which extends substantially parallel to the longitudinal axis of the base 14 and of the air dryer cartridge 12.

Here, the longitudinal axis L of the base 14 and of the air dryer cartridge 12 is furthermore designed as the axis of symmetry or center line thereof.

In the context of this invention, the terms "radial" or "radial direction" should accordingly be interpreted to mean a direction or a direction vector which extends radially outward substantially perpendicularly and with a central starting point from the longitudinal axis L of the base 14 and of the air dryer cartridge 12.

The supporting element 24 can be formed from a thermoplastic or from a thermoset.

It is also additionally contemplated that the supporting element 24 can be formed from a metallic material, such as steel.

Provision can furthermore be made for the supporting element 24 to be formed from a composite material consisting of steel, a thermoplastic and a thermoset. Possible examples of a thermoplastic are: acrylonitrile-butadiene-styrene (ABS), polyamides (PA), polylactate (PLA), polymethyl methacrylate (PMMA), polycarbonate (PC), polyethylene terephthalate (PET), polyethylene (PE), polypropylene (PP), polystyrene (PS), polyether ether ketone (PEEK), polyvinylchloride (PVC), celluloid, polyolefin, polyether ketones (PEK), polyphenylene sulfide (PPS), polyamide 11/12 (PA 11/12), polyamide 46 (PA 46), polyphthalamides (PPA), syndiotactic polystyrene (SPS), thermoplastic elastomers (TPE), polybutylene terephthalate (PBT), polyamide imides (PAI), polyphenylene sulfone (PPSU), polysulfones (PSU), polyether sulfone (PES), polycarbonate-polyethylene terephthalate compounds (PC/PET), polycarbonate-acrylonitrile-butadiene-styrene compounds (PC/ABS) or styrene-acrylonitrile copolymer (SAN).

Thermoplastics of this kind can be used individually or in combination for the supporting ring 24.

Possible examples of a thermoset are: chitin, chitosan, epoxy resin, urea-formaldehyde resin (UF), melamine-formaldehyde resin (MF), melamine/phenol formaldehyde (MPF), phenol formaldehyde resin (PF), polyester, polyurethane (PUR) or unsaturated polyester (UP).

Thermosets of this kind can be used individually or in combination for the supporting ring 24.

The supporting ring 24 can furthermore also be formed from a thermoplastic and a thermoset.

The supporting element 24 can furthermore be designed as a closed supporting ring 24.

The sealing element 16 is thus supported in the axial direction in relation to the longitudinal axis L between the sheet metal element 18 and the bearing surface 22 by means of the supporting element 24.

The sealing element 16 can furthermore also be supported in the radial direction in relation to the longitudinal axis L between the sheet metal element 18 and the bearing surface 22 by means of the supporting element 24.

The supporting ring 24 furthermore has a supporting surface 24a for the sealing element 16, which encloses an acute angle with the bearing surface 22 in the assembled state.

The supporting ring 24 furthermore has a radially outer surface which has the same alignment as the bearing surface 22 of the base-side extension 20.

This supporting surface 24a can have a curved or concave shape in relation to the cross section of the supporting element 24, wherein the supporting surface 24a is matched to the shape of the sealing element 16.

The sheet metal element 18 furthermore has an end section 26 which is radially on the inside in relation to the longitudinal axis L of the base 14 and of the air dryer cartridge 12.

In the assembled state, this end section 26 partially surrounds the sealing element 16.

In the assembled state, the sealing element 16 can furthermore be pressed radially and axially against the supporting surface 24a of the supporting element 24 in relation to the longitudinal axis L of the base 14 and of the air dryer cartridge 12 by means of the end section 26.

The sheet metal element 18 is furthermore fastened on the air-dryer-cartridge side and, in the assembled state, presses the sealing element 16 against the bearing surface 22.

In the assembled state, the sealing element 16 is thus pressed radially against the bearing surface 22 of the base-side extension 20.

The sheet metal element 18 furthermore forms a base-side cover for the air dryer cartridge 12 and faces the base-side extension 20 in the assembled state.

The sheet metal element 18 has a round basic shape.

Accordingly, the sheet metal element 18 is designed as a closed ring.

The sheet metal element 18 furthermore has an outer radial end region, which is lock-seamed or flanged to a housing region of the air dryer cartridge 12 at the housing bottom thereof.

In the assembled state of the air dryer cartridge 12, this housing bottom likewise faces the base-side extension 20.

The air dryer cartridge 12 furthermore has an oil filter (not shown in FIG. 1).

The air dryer cartridge 12 furthermore additionally comprises a check valve, which blocks the passage of the air dryer cartridge 12 in the case of compressed air delivery and opens it during the regeneration thereof, in particular in order to bypass the oil filter.

The sealing element 16 is designed as a sealing ring 16 in the form of an O-ring with a circular cross section.

The sealing element 16 is furthermore formed from an elastomer.

The elastomer is designed as a rubber material or material based on unvulcanized rubber.

The material based on unvulcanized rubber can have either a natural rubber or a synthetic rubber as a basis.

Possible examples of an elastomer of this kind are: polyacrylate rubber, chloropolyethylene rubber, chlorosulfonyl polyethylene rubber, ethylene-propylene-diene rubber, ethylene-propylene rubber, fluorinated rubber, tetrafluoroethylene-propylene copolymer rubber, Hifluor fluorinated rubber, perfluorinated elastomer, butadiene rubber, chloroprene rubber, isobutene-isoprene rubber (butyl rubber), bromobutyl rubber, chlorobutyl rubber, isoprene rubber, acrylonitrile-butadiene rubber, hydrated acrylonitrile-butadiene rubber, natural rubber, styrene-butadiene rubber, fluorosilicone rubber, methyl-phenyl-silicone rubber, methyl-phenyl-vinyl-silicone rubber, methyl-silicone rubber, methyl-vinyl-silicone rubber, polyester-urethane or polyether-urethane.

Elastomers of this kind can be used individually or in combination for the sealing ring 16.

The end section 26 of the sheet metal element 18 furthermore has a bent section radially in relation to the longitudinal axis L of the base 14 and of the air dryer cartridge 12.

This bent section is formed integrally radially on the inside of an intermediate section of the sheet metal element 18, said intermediate section being matched to the contour of the air dryer cartridge 14.

In the assembled state, the bent section is furthermore bent in a direction toward the base-side extension 20.

The bent section has a hook-type shape.

Furthermore, the base-side extension 20 has an extension shoulder 28.

The extension shoulder 28 has a radially extending extension surface in the form of a circular ring, wherein the central axis of this extension surface is aligned coaxially with the longitudinal axis L.

The extension shoulder 28 furthermore has an axially extending circular-cylindrical extension surface as a lateral surface, wherein the central axis of this extension surface is aligned coaxially with the longitudinal axis L.

Starting from the axially extending extension surface of the extension shoulder 28, the bearing surface 22 of the base-side extension 20 extends in the axial direction as far as an end of the base-side extension 20 which faces the sheet metal element 18.

The axially extending extension surface of the extension shoulder 28 and the bearing surface 22 of the base-side extension 20 can also be arranged flush with one another.

In the assembled state, the supporting element 24 is furthermore placed against the extension shoulder 28.

According to FIG. 1, the supporting element 24 has two surfaces corresponding to or aligned with the two extension surfaces of the extension shoulder 28.

The supporting element can furthermore be placed against the extension shoulder 28 in such a way that the supporting element 24 is supported axially and radially in relation to the longitudinal axis L of the base 14 and of the air dryer cartridge 12 by means of the extension shoulder 28.

The sealing interface 10 furthermore has a holding element 30 in the form of a holding ring 30.

The holding element 30 can preferably be designed as a holding element 30 separate from the sheet metal element 18.

It is furthermore contemplated for the holding element 30 to be part of the air dryer cartridge 12.

It is also possible, in particular, for the holding element 30 to be connected integrally to the air dryer cartridge 12.

If the holding element 30 and the air dryer cartridge 12 are composed of different materials, they can be connected to one another by material bonding.

Examples of such material bonding can be, for example, vulcanizing, adhesive bonding, brazing, welding etc.

The holding ring 30 is formed from an elastomer of the kind described above.

Provision can furthermore be made for the holding ring 30 to be formed from a thermoplastic of the kind described above.

Moreover, provision can be made for the holding ring 30 to be formed from a thermoset of the kind described above.

It is also additionally contemplated that the holding ring 30 can be formed from a metallic material, such as steel.

It is furthermore contemplated that the holding ring is also formed by a combination of a thermoplastic, thermoset or elastomer (of the kind described above).

Provision can furthermore be made for the holding ring 30 to be formed from a composite material consisting of steel, a thermoplastic, an elastomer and a thermoset.

According to FIG. 1, the holding ring 30 is arranged between the base-side extension 20 and the sheet metal element 18 in the assembled state.

According to FIG. 1, the sheet metal element 18 furthermore has a supporting projection 18a.

The supporting projection 18a is designed as a continuous radial web 18a in the form of a circular ring of U-shaped cross section.

The supporting projection 18a is arranged on the sheet metal element 18 in such a way that the supporting projection 18a makes radial contact with the holding ring 30 on the outer contour of the latter in the assembled state.

By means of the supporting projection 18a, the holding element 30 can be supported radially on the outside in relation to the longitudinal axis of the base 14 and of the air dryer cartridge 12.

Provision can likewise be made for the holding ring 30 to be arranged between the base-side extension 20 and a housing wall 32 of the air dryer cartridge 12 and the sheet metal element 18 in the assembled state.

In the assembled state, the holding ring 30 furthermore forms a press fit with the base-side extension 20 as well as with the sheet metal element 18 and the housing wall 32.

The holding ring 30 furthermore partially surrounds one end of the base-side extension 20 which faces the sheet metal element 18.

The holding ring 30 furthermore has a radial region 34.

This radial region 34 extends radially between the end section 26 of the sheet metal element 18 and the bearing surface 22 of the base-side extension 20 in relation to the longitudinal axis L of the base 14 and the air dryer cartridge 12.

The radial region 34 furthermore has a wedge-shaped cross section.

This wedge-shaped cross section tapers radially inward in relation to the longitudinal axis L of the base 14 and of the air dryer cartridge 12.

In addition, the radial region 34 has a contact pressure surface 34a for the sealing element 16.

In the assembled state, the contact pressure surface 34a is in turn aligned substantially perpendicularly to the bearing surface 22 of the base-side extension 20.

The contact pressure surface 34a can furthermore have a recessed surface 34b, which faces the sealing element 16 in the assembled state, is in the form of a closed ring and is matched to the contour of the sealing ring 16.

The holding ring 30 furthermore has an annular, radially encircling base recess 30a, by means of which the holding ring 30 radially and axially surrounds the base-side extension 20 in the assembled state.

In the assembled state, the base recess 30a faces the base-side extension 20.

In the example shown, the base recess 30a surrounds the base-side extension 20 from both sides here.

The surrounding of the base-side extension 20 additionally increases the positioning accuracy of the holding ring 30.

In addition, an outer contour 30b of the holding ring 30 which faces the sheet metal element 18 or is in contact with the latter in the assembled state is matched to the shape of the sheet metal element 18 and the end section 26 thereof.

Consequently, the outer contour 30b of the holding ring 30 has a first contour section 30c, which is aligned substantially perpendicularly to the bearing surface 22 in the assembled state.

A second contour section 30d is formed integrally on or connected to the first contour section 30c, radially on the inside of the latter.

In this case, a contact surface of the second contour section 30d which is in contact with the end section 26 in the assembled state encloses an acute angle with the bearing surface 22 of the base-side extension 20.

In other words, there is a bend 30e formed between the first contour section 30c and the second contour section 30d.

The first contour section 30c can be designed in such a way that it is substantially in full contact with one surface of the sheet metal element 18 in the assembled state.

The second contour section 30d can furthermore be designed in such a way that it is substantially in full contact with one (other) surface of the sheet metal element 18 in the assembled state.

Either of the two contacts is already sufficient in itself to establish the positioning of the holding element 30 and the sheet metal element 18.

Combined bearing support and the provision of two contact surfaces improves this effect.

In the illustrative embodiment shown, both the first contour section 30c and the second contour section 30d and also the bend 30e between the first contour section 30c and the second contour section 30d rest against a corresponding mating surface or mating contour of the sheet metal element 18. In other words, it is possible to state that the first contour section 30c and the second contour section 30d and also the bend 30e are almost fully in contact in the assembled state with a mating contour of the sheet metal element 18, which is correspondingly designed as a counterpart and is matched to the contour of the first contour section 30c and the second contour section 30d and also the bend 30e.

The contour section 30c serves as or forms a first stabilizing surface 30c, which is characterized and arranged in such a way in the assembled state that it serves to stabilize the air dryer cartridge 12 in the axial direction.

Adjoining the second contour section 30d is a stabilizing section 30f or a radial holding and/or pressure surface or stabilizing surface 30f of the holding element 30. As a result, the sealing interface 10 furthermore has at least one second radial holding and/or pressure surface 30f, which is characterized and arranged in such a way in the assembled state that it holds and/or presses the sealing element 16 in the radial direction against the radially inward-directed bearing surface 22 of the base-side extension 20.

The contact pressure surface 34a has a third stabilizing surface 34a, which is characterized and arranged in such a way in the assembled state that it serves to stabilize the sealing element 16 and/or that it holds the sealing element 16 in the axial direction and/or stabilizes it against further pressure influences.

As already described above, the sealing element 16 is pressed against the bearing surface 22 of the base-side extension 20 by means of the sheet metal element 18 in the assembled state, wherein furthermore the sealing element 16 can be supported by means of the supporting element 24.

Accordingly, the sealing element 16 is additionally pressed against the holding ring 30.

Figure 3:
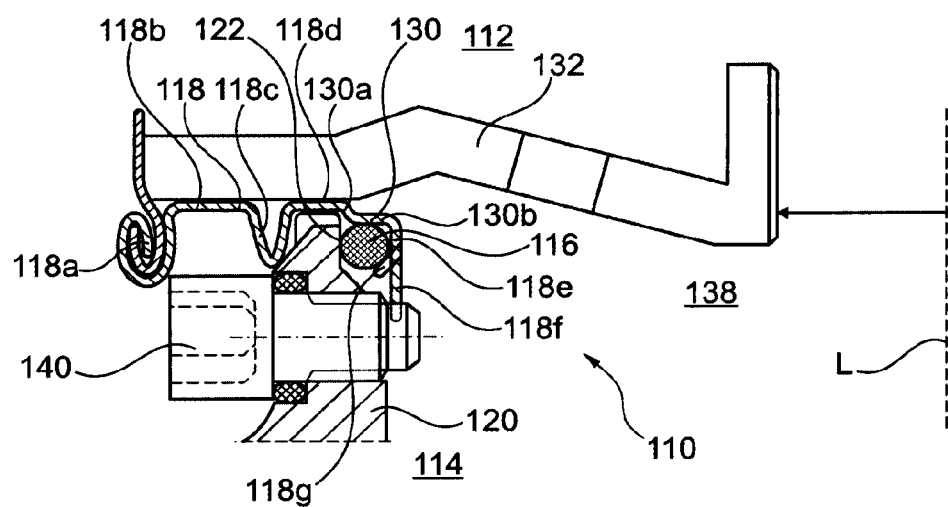
FIG. 3 shows a schematic sectional illustration of a second illustrative embodiment of a sealing interface according to the invention.

According to another illustrative embodiment (not illustrated in FIG. 1), the sealing element 16 and the holding element 30 are connected integrally to one another (cf. FIG. 3).

The base-side extension 20 and the end section 26 of the sheet metal element 18 furthermore form a connecting gap 36.

In particular, the connecting gap can be designed as an annular connecting gap 36.

Accordingly, the connecting gap can also be of radially continuous design.

Consequently, the sealing element 16 is subjected to pressure and connected to pressure by compressed air from a pressure chamber 38 on the air-dryer-cartridge side by means of the connecting gap 36.

Moreover, the sheet metal element 16 and a securing element 40 form an anti-rotation safeguard for the air dryer cartridge 12 and for the base 14.

The securing element 40 is fastened on the base-side extension 20.

The securing element 40 is designed as a securing screw 40 and can be screwed radially from the outside into the base-side extension 20.

In this context, the end section 26 of the sheet metal element 18 can be designed in some section or sections as a bayonet ring with a corresponding bayonet recess.

The counterpart corresponding to the bayonet recess is formed by the securing screw 40.

Of course, the end section 26 of the sheet metal element 18 can have a plurality of such bayonet recesses, which can then be connected to a plurality of corresponding securing screws 40.

To form one or more bayonet recesses, the sheet metal element 18 has one or more securing fingers on its end section 26.

This securing finger or these securing fingers 18*b* secure the securing screw 40 in the form of a bayonet joint in the assembled state.

At the free end of the screw pin of the securing screw 40 it is furthermore possible to arrange a cone which interacts with the securing finger 18*b* of the bayonet ring in the assembled state.

By means of the cone, the air dryer cartridge 12 can be rotated into a final position by screwing the securing screw 40 into the base-side extension 20.

Accordingly, it is possible for the air dryer cartridge 12 to be screwed into the end position with just a screwing tool by screwing in the securing screw 40, thereby making the use of a special tool superfluous.

The securing screw 40 furthermore has a sealing element in the form of an O-ring for sealing the system pressure within the base-side extension 20 or the air dryer cartridge 12 with respect to ambient pressure.

Moreover, it is contemplated that the anti-rotation safeguard provided by the holding ring 30, the base-side extension 20, the sheet metal element 18 and the housing wall 32 of the air dryer cartridge 12 is formed by means of frictional engagement or nonpositive engagement.

This makes it possible to dispense with the bayonet ring of the end section 26 of the sheet metal element and with the securing screw 40.

In addition, the end section 26 of the sheet metal element 18 can have one or more holding fingers for holding the O-ring 16 axially within the end section 26, thus securing the O-ring 16 against falling axially out of the sealing interface during assembly or disassembly when the air dryer cartridge is unpressurized.

The function of the sealing interface 10 can now be described as follows:

The sectional view, illustrated in FIG. 1, of the sealing interface 10 according to the invention relates, in particular, to the assembled state.

According to FIG. 1, the sealing element 16 is shown therein, forming a total of four effective surface pairs with effective surfaces surrounding the sealing element 16.

The first effective surface pair is formed by a radial inner surface of the end section 26 of the sheet metal element 18 and of the sealing element 16 which is partially surrounded by the end section 26.

Since the end section 26 of the sheet metal element 18 has a section which is bent and hook-shaped as described above, the radial inner surface of the end section 26 can be pressed radially and axially against the sealing ring 16, thereby deforming the latter.

The axial and radial sealing force produced owing to such shaping of the bent section of the sheet metal element 18 presses the sealing ring 16 radially against the inner bearing surface 22 of the base-side extension 20.

Accordingly, a second effective surface pair is formed between the sealing ring 16 and the bearing surface 22.

A third effective surface pair can be formed by the corresponding contact point of the sealing ring 16 with the supporting surface 24*a* of the supporting ring 24, which supports the sealing ring 16 in the axial and radial directions.

In addition, the supporting ring 24 presses the sealing ring 16 axially against the holding ring 30 with a reaction force (in relation to the axial and radial sealing force produced by the end section 26) by means of the supporting surface 24*a*.

The reaction force can be produced by the positioned state of the supporting element 24 against the extension shoulder 28 and can be transmitted to the sealing ring 16 in corresponding fashion by the supporting ring 24.

The sealing ring 16 and the holding ring 30 thus form the fourth effective surface pair.

The four sealing or effective surface pairs described above between the sealing ring 16 and the surfaces bounding said ring form an efficient and structurally simple sealing interface 10, by means of which a predetermined or defined sealing effect can be implemented structurally in a very simple manner.

Moreover, by virtue of the radially inner arrangement of the sealing element 16 and of the radially inner alignment of the end section 26 (in each case in relation to the bearing surface 22 of the base-side extension 20), the entire structural design of the sealing interface 10 is of very compact construction, especially in the radial direction.

Moreover, the above-described structural configuration of the sealing interface 10 allows a particularly high positioning accuracy of the sealing element 16, optionally of the supporting element 24, and of the holding ring 30.

In the case of an annular structure, a more compact construction of the sealing interface 10 allows a significant reduction in the lever arm of acting forces, thereby likewise minimizing the component loading due to the additionally acting torques at the sealing interface 10.

Moreover, the pressure force exerted on the end section 26 by the fluid pressure (up to 17 bar) of the compressed air produces a pressure force vector directed radially outward in relation to the longitudinal axis L.

Consequently, the radial and axial sealing force impressed upon the sealing element 16 by the end section 26 can be increased, thereby further improving the sealing effect of the sealing interface.

Figure 2:
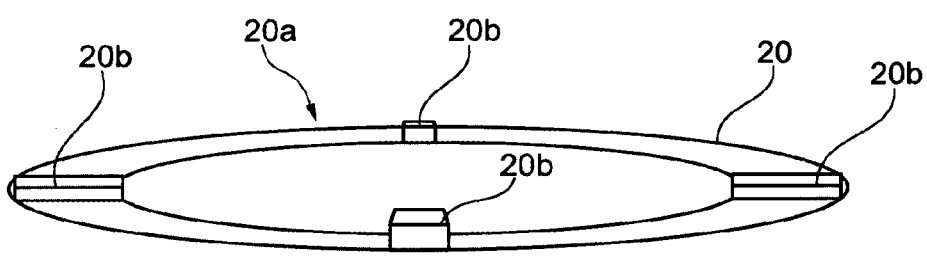
FIG. 2 shows a schematic illustration of an end region of a base-side extension for the sealing interface shown in FIG. 1.

FIG. 2 shows a schematic illustration of an end region 20*a* of the base-side extension 20 for the sealing interface 10 shown in FIG. 1.

Here, the end region 20*a* has an outer contour with four raised portions 20*b*, which face the holding element 30 in the assembled state. In this context, it is contemplated that the raised portions rise as rectangular elements from the surface of the end region 20*a* of the base-side extension 20. However, the possibility that rounded portions and ramps that adjoin the raised portions 20*b* laterally are provided here is also contemplated.

In the assembled state, the raised portions 20*b* interact with a mating contour, e.g. a mating contour in the holding element 30, in the sheet metal element 18 and/or in some other abutment, such as a housing wall of the air dryer cartridge (not illustrated specifically).

The raised portions 20*b* and the mating contour can be arranged so that they engage at least partially one inside the other. The mating contour can be characterized by sunk areas, notches, recesses and corresponding counterparts such as raised portions.

These contours and profile elements make it possible to variably set the pressure surface of the holding ring 30 onto the base-side extension 20 and also the surface pressure which occurs there in this region. It is thereby possible to make the configuration more variable overall.

It is also possible that further design parameters in respect of the fastening of the air dryer cartridge 12 will be available by virtue of the variable setting of the pressure surface. The contour makes it possible, by means of the adjustable area, to obtain a further design parameter which influences the tightening of the air dryer cartridge 12.

Thus, the tightening of the air dryer cartridge 12 no longer depends only on the material properties of the holding ring 30. It is thereby also possible to shorten the required rotation path when screwing in the air dryer cartridge 30 at the interface 10 with the base 14.

The above-described outer contour can be achieved in a particularly advantageous manner on the base-side extension 20 in the end region 20a thereof because this contour can be cast by aluminum diecasting.

As an alternative, however, provision can also be made for the holding element or the holding ring 30 to have the above-described outer contour with the four raised portions as shown in FIG. 2 and for the base-side extension 20 or the end region 20a thereof to have the mating contour correspondingly described above.

FIG. 3 shows a schematic sectional illustration of a second illustrative embodiment of a sealing interface 110 according to the invention.

Sealing interface 110 has all the structural and functional features of sealing interface 10.

Only the following differences will now be explained.

In this case, the sealing interface 110 is likewise arranged between an air dryer cartridge 112 and a base 114 for an air dryer cartridge 112.

Features that are identical or comparable to those in the illustrative embodiment shown in FIG. 1 are denoted by a value incremented by the value 100.

Here too, a sealing element 116 is provided.

In this case, the sealing element 116 is likewise arranged between a sheet metal element 118 on the air-dryer-cartridge side and a base-side extension 120.

Here too, the base-side extension 120 furthermore has a bearing surface 122 for the sealing element 116, said surface being directed radially inward in relation to the longitudinal axis L of the base 114 and of the air dryer cartridge 112.

In contrast to the embodiment shown in FIG. 1, no supporting element 24 is provided here.

A holding shoulder 130 is provided here as a holding element 130.

In this case, the holding shoulder 130 is formed integrally in the sheet metal element 114 by forming.

Radially inward from the flange 118a, the sheet metal element 118 first of all has a contact section 118b, which rests against a bottom part or a housing wall 132 of the air dryer cartridge 112.

Starting from this point and proceeding radially further inward, a supporting projection 118c, which corresponds essentially to the function of the supporting projection 18a according to the illustrative embodiment shown in FIG. 1, extends away from the housing wall 132. The supporting projection 118c then extends back toward a contact surface 118d, which once again rests against the housing wall 132. The contact surface 118d is adjoined by the holding element 130, initially with an extension projection 130a, which follows the outer contour of the base 114 in the assembled state. Extending away from there with a 90° bend and parallel to the surfaces 118b and 118d is a holding element section 130b, which is provided in the axial direction to support the sealing element 116.

Adjoining this section 130b is a section 118e which extends substantially axially or in the longitudinal direction of the axis L and which serves for the radial support of the sealing element 116.

Adjoining this section 118e are the securing fingers 118f (corresponding to securing finger 18b according to the illustrative embodiment in FIG. 1) and corresponding holding fingers 118g (also shown in the illustrative embodiment shown in FIG. 1), wherein the holding fingers 118g serve for additional firm holding of the sealing element 116.

The pressure chamber on the air-dryer-cartridge side is denoted by the reference sign 138.

Here too, a securing screw 140 is provided.

LIST OF REFERENCE SIGNS 10 sealing interface
12 air dryer cartridge
14 base
16 sealing element
18 sheet metal element on the air-dryer-cartridge side
18a supporting projection
18b securing finger
20 base-side extension
20a end region of the base-side extension
20b raised portion
22 bearing surface
24 supporting element; supporting ring
24a supporting surface
26 radially inner end section
28 extension shoulder
30 holding element; holding ring
30a base recess
30b outer contour
30c first contour section, first stabilizing surface
30d second contour section
30e bend
30f stabilizing surface, stabilizing section
32 housing wall of the air dryer cartridge
34 radial region of the holding ring
34a contact pressure surface of the radial region
34b recessed surface of the contact pressure surface
36 connecting gap
38 pressure chamber on the air-dryer-cartridge side
40 securing element
L longitudinal axis
110 sealing interface
112 air dryer cartridge
114 base
116 sealing element
118 sheet metal element on the air-dryer-cartridge side
118a flange
118b contact section
118c supporting projection
118d contact surface
118e section
118f securing finger
118g holding finger
120 base-side extension
122 bearing surface
130 holding element, holding shoulder
130a extension projection
130b holding element section
132 housing wall of the air dryer cartridge
138 pressure chamber on the air-dryer-cartridge side
140 securing element
L longitudinal axis

What is claimed is:

1. A sealing interface for sealing between an air dryer cartridge and a base for an air dryer cartridge, comprising:
   at least one sealing element;
   at least one sheet metal element on the air-dryer-cartridge side; and
   at least one base-side extension, wherein
   the base-side extension has a bearing surface for the sealing element, which bearing surface is directed radially inward relative to a longitudinal axis of the base and of the air dryer cartridge, the sheet metal element is fastened on the air-dryer-cartridge side, and in the assembled state, the sealing element presses against the bearing surface; and a holding element which, in the assembled state, is arranged such that the sealing element is held between the sheet metal element and the bearing surface at least partially in the axial and/or radial direction relative to the longitudinal axis by way of the sheet metal element and/or the holding element.

2. The sealing interface as claimed in claim 1, wherein the holding element is arranged between the sheet metal element and the base-side extension, at least in some section or sections.

3. The sealing interface as claimed in claim 1, wherein the holding element is a separate component from the sheet metal element.

4. The sealing interface as claimed in claim 1, wherein the holding element is formed by a holding section of the sheet metal element.

5. The sealing interface as claimed in claim 4, wherein the holding element is formed by a step and/or an offset of the sheet metal element.

6. The sealing interface as claimed in claim 1, wherein the sealing interface has at least one first stabilizing surface, which is characterized and arranged such that in the assembled state it serves to stabilize the air dryer cartridge in the axial direction.

7. The sealing interface as claimed in claim 6, wherein the first stabilizing surface is formed by a first stabilizing surface section of the sheet metal element.

8. The sealing interface as claimed in claim 6, wherein the sealing interface further has at least one second radial holding and/or pressure surface, which is characterized and arranged such that in the assembled state it holds and/or presses the sealing element in the radial direction against the radially inward-directed bearing surface of the base-side extension.

9. The sealing interface as claimed in claim 8, wherein the sealing interface further has at least one third stabilizing surface, which is characterized and arranged such that in the assembled state it serves to stabilize the sealing element and/or it holds the sealing element in the axial direction and/or stabilizes it against further pressure influences.

10. The sealing interface as claimed in claim 1, wherein the sheet metal element has at least one end section situated radially on the inside in relation to the longitudinal axis of the base and of the air dryer cartridge, said end section at least partially surrounding the sealing element in the assembled state.

11. The sealing interface as claimed in claim 10, wherein the sealing element is pressed radially and/or axially against the holding element in relation to the longitudinal axis of the base and of the air dryer cartridge by way of the end section in the assembled state.

12. The sealing interface as claimed in claim 1, wherein the holding element partially surrounds at least one end of the base-side extension, which end faces the sheet metal element.

13. The sealing interface as claimed in claim 1, wherein the holding element has at least one radial region, which extends radially between the end section of the sheet metal element and the bearing surface of the base-side extension in relation to the longitudinal axis of the base and of the air dryer cartridge, and the radial region has a wedge-shaped cross section.

14. The sealing interface as claimed in claim 1, wherein the holding element is configured as a holding ring, which, in some section or sections, is arranged between the base-side extension and at least one housing wall of the air dryer cartridge and/or the sheet metal element in the assembled state, and at least in some section or sections, the holding element forms a press fit with the base-side extension and the sheet metal element and/or the housing wall in the assembled state.

15. The sealing interface as claimed in claim 1, wherein the sealing element is pressed against the bearing surface of the base-side extension in such a way by the sheet metal element in the assembled state that the sealing element is additionally pressed against the holding element.

16. The sealing interface as claimed in claim 1, wherein the holding element has at least one contact pressure surface for the sealing element, and the contact pressure surface is aligned substantially perpendicularly to the bearing surface of the base-side extension in the assembled state.

17. The sealing interface as claimed in claim 1, wherein the base-side extension and the end section of the sheet metal element form at least one connecting gap, by which the sealing element is subjected to pressure and/or connected to pressure via at least one fluid from at least one pressure chamber on the air-dryer-cartridge side.

18. The sealing interface as claimed in claim 1, wherein the sheet metal element and/or at least one securing element, which is fastened to the base-side extension, forms at least one anti-rotation safeguard for the air dryer cartridge and for the base.

19. The sealing interface as claimed in claim 1, wherein the sealing element is an O-ring of circular cross section, wherein the sealing element is formed at least partially from an elastomer.

20. The sealing interface as claimed in claim 1, wherein the holding element is formed at least partially from a thermoplastic, at least partially from a thermoset, and/or at least partially from an elastomer.

21. The sealing interface as claimed in claim 1, wherein the sealing element and the holding element are connected integrally to one another.

22. The sealing interface as claimed in claim 1, wherein the sheet metal element has at least one supporting projection, by which the holding element is supported radially on the outside in relation to the longitudinal axis of the base and of the air dryer cartridge.

23. The sealing interface as claimed in claim 1, wherein at least one supporting element, which is arranged in such a way in the assembled state that the sealing element is supported at least partially in the axial direction in relation to the longitudinal axis by the supporting element, is provided between the sheet metal element and the bearing surface.

24. The sealing interface as claimed in claim 23, wherein the supporting element has a substantially wedge-shaped cross section, and the cross section tapers radially inward in relation to the longitudinal axis of the base and of the air dryer cartridge.

25. The sealing interface as claimed in claim 23, wherein
the supporting element is a supporting ring, and
the supporting ring has at least one supporting surface for the sealing element, which encloses an acute angle with the bearing surface in the assembled state.

26. The sealing interface as claimed in claim 23, wherein
the base-side extension is of substantially annular design, and has at least one extension shoulder, and
the supporting element is placed against the extension shoulder in such a way in the assembled state that the supporting element is supported at least partially axially and/or at least partially radially in relation to the longitudinal axis of the base and of the air dryer cartridge by the extension shoulder.

27. The sealing interface as claimed in claim 1, wherein the sheet metal element has a round basic shape of annular design.

28. An air dryer cartridge for an air treatment unit, wherein the air dryer cartridge is configured for use with a sealing interface as claimed in claim 1.

29. A base for an air treatment device, wherein the base is configured for use with a sealing interface as claimed in claim 1, and
wherein an air dryer cartridge is fastenable to the base.

30. An air treatment unit comprising:
at least one sealing interface as claimed in claim 1:
at least one air dryer cartridge; and
at least one base.

* * * * *